United States Patent
Harada

(10) Patent No.: US 11,912,288 B2
(45) Date of Patent: Feb. 27, 2024

(54) CONTROL SYSTEM FOR MOVING OBJECT

(71) Applicant: Mazda Motor Corporation, Hiroshima (JP)

(72) Inventor: Yasuhiro Harada, Aki-gun (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 274 days.

(21) Appl. No.: 17/161,673

(22) Filed: Jan. 29, 2021

(65) Prior Publication Data

US 2021/0253114 A1    Aug. 19, 2021

(30) Foreign Application Priority Data

Feb. 14, 2020  (JP) .................. 2020-023625

(51) Int. Cl.
*B60W 50/00* (2006.01)
*B60R 16/023* (2006.01)
*G05B 15/02* (2006.01)

(52) U.S. Cl.
CPC ......... *B60W 50/00* (2013.01); *B60R 16/0231* (2013.01); *G05B 15/02* (2013.01); *B60W 2050/0004* (2013.01); *B60W 2050/0028* (2013.01)

(58) Field of Classification Search
CPC .............. B60R 16/0231; B60W 50/00; B60W 2050/0004; B60W 2050/0028; G05B 15/02; G05B 19/0428; G05B 2219/24024; F02D 37/02; F02D 41/401; F02D 2041/202; F02D 2041/2024; F02D 2041/2027; F02D 2041/285; F02D 2041/286; F02D 41/28
See application file for complete search history.

(56) References Cited

U.S. PATENT DOCUMENTS

| | | | |
|---|---|---|---|
| 8,156,269 B2 * | 4/2012 | Guido | F02D 37/02 341/110 |
| 2016/0131205 A1 * | 5/2016 | Essenmacher | F16D 28/00 192/41 A |
| 2017/0292467 A1 * | 10/2017 | Schweikert | F02D 41/28 |
| 2017/0361824 A1 * | 12/2017 | Rizzo | B60T 13/12 |
| 2021/0188252 A1 * | 6/2021 | Lu | B60W 50/00 |

FOREIGN PATENT DOCUMENTS

JP    2017-61278 A    3/2017

* cited by examiner

*Primary Examiner* — Geepy Pe
*Assistant Examiner* — Kimia Kohankhaki
(74) *Attorney, Agent, or Firm* — XSENSUS LLP

(57) ABSTRACT

A controller causes a calculation device to perform calculation that determines an operation of a moving object and generates digital signals that define the operations of actuators. The generated digital signals are output to a digital signal transmission path by a signal bus control IC. ICs attached to the actuators obtain digital signals that define the operations of the actuators from the digital signal transmission path and generate control signals for the actuators based on the operations defined by the digital signals.

20 Claims, 8 Drawing Sheets

CONTROL SYSTEM FOR MOVING OBJECT

CROSS-REFERENCE TO RELATED APPLICATION

The present application contains subject matter related to Japanese Priority Application 2020-023625, filed in the Japanese Patent Office on Feb. 14, 2020, the entire contents of which being incorporated herein by reference in its entirety.

BACKGROUND

Field

The technology disclosed herein relates to a control system that controls many devices installed in a moving object such as a vehicle.

Description of the Related Art

In recent years, almost all actuators installed in vehicles are electronically controlled. Accordingly, many ECUs (electronic control units) for controlling individual actuators are installed in vehicles.

Patent document 1 discloses the structure of a control system for controlling various in-vehicle devices installed in a vehicle. This control system is divided into a plurality of domains (energy domain, body domain, and motion domain) according to the roles (functions) of individual in-vehicle devices and each of the domains has a layered structure in which the device control unit for controlling the in-vehicle devices and the domain control unit for centrally controlling the device control unit are present. Furthermore, this control system has an integrated control unit for coordinating and collaborating the control by the individual domain control units. The device control units, domain control units, and integrated control units are actually embodied by being implemented in ECUs as programs and databases.

PRIOR ART DOCUMENTS

Patent Documents

[Patent document 1] JP-A-2017-61278

SUMMARY

In the structure in which an ECU is provided for each device in a vehicle, the number of dedicated ECUs is enormous and one vehicle has several hundreds of ECUs for a model with many ECUs. Accordingly, the number of wires and connectors that connect between individual ECUs and between individual ECUs and sensors also increases. As a result, the structure of the communication system of a vehicle becomes complicated and the cost increases.

In addition, in the structure in which the control units are layered as in patent document 1, a plurality of ECUs are present in the communication paths from the integrated control unit to individual in-vehicle devices. This leads to an increase in cost and power consumption. In an ideal case, signals are preferably transmitted without relaying by ECUs in the communication paths from the calculation device to individual in-vehicle devices. Accordingly, the cost can be reduced significantly and the power consumption can also be reduced.

For example, in the case of a vehicle, however, fine control is required for actuators for an internal combustion engine or the like. Accordingly, even if the functions of individual ECUs are simply integrated into one calculation device, the communication control between the actuators and the calculation device becomes complicated and the amount of communication becomes enormous, thereby causing degradation of responsiveness of control.

The objects of the technology disclosed herein is to achieve a control system that controls a plurality of hardware units (e.g., circuitry, etc.) installed in a moving object, using a simple structure.

Means for Solving the Problems

To solve the above-described and other problems, according to the techniques disclosed herein, there is provided a control system that controls a plurality of hardware units installed in a moving object, the control system including a digital signal transmission path that transmits a digital signal without including a relay ECU (electronic control unit) in the digital signal transmission path; a controller that includes at least a calculator to calculate an operation of the moving object and a signal bus control integrated circuit (signal bus control IC) for inputting and outputting the digital signal to and from the digital signal transmission path; and a plurality of ICs, that are attached to actuators, configured to control the hardware units and connected to the digital signal transmission path. The controller is configured to cause the calculator to perform calculation that determines an operation of the moving object, generate a digital signal that defines an operation of the actuators according to a result of the calculation, and cause the signal bus control IC to output the generated digital signal to the digital signal transmission path, and the plurality of ICs obtain the digital signal that defines the operation of the actuators from the digital signal transmission path and generate a control signal for the actuators based on the operation defined by the obtained digital signal.

According to this structure, the controller causes the calculation device to perform calculation that determines the operation of the moving object and generates the digital signal that defines the operation of the actuators according to the result of the calculation. The generated digital signal is output to the digital signal transmission path by the signal bus control IC. The ICs attached to the actuators obtain the digital signal that defines the operation of the actuators from the digital signal transmission path and generate the control signal for the actuators based on the operation defined by this digital signal. That is, in an exemplary embodiment, the controller only needs to output the digital signal that defines the operation of the actuators to the digital signal transmission path to control the plurality of hardware units and does not need to control the actuators via full time communication. The real-time control of the actuators is performed by the ICs attached to the actuators. Accordingly, the control system can control the actuators responsively using the single controller.

In addition, since the digital signal transmission path does not include a relay ECU, the signal is transmitted without relaying by the ECU in the communication path between the controller and the actuators. Accordingly, the cost can be reduced significantly and the power consumption can also be reduced.

In addition, the ICs attached to the actuators can be made versatile by defining standards or rules concerning the information represented by the digital signal output by the controller. That is, the ICs attached to the actuators only need to have the function (so-called signal translating function) of converting the operation of the actuators specified by the obtained digital signal to the control signal given to the actuators. Accordingly, the cost of the ICs attached to the actuators can be reduced and the cost performance of the control system can be improved.

In addition, preferably, the actuators include a first actuator having a solenoid, the controller outputs, to the digital signal transmission path, a first digital signal that identifies an electric signal given to the solenoid of the first actuator, and a first IC attached to the first actuator among the plurality of ICs obtains the first digital signal from the digital signal transmission path, generates the electric signal identified by the first digital signal, and gives the generated electric signal to the solenoid of the first actuator.

Accordingly, in controlling the first actuator having the solenoid, the controller only needs to output, to the digital signal transmission path, the first digital signal that identifies the electric signal given to the solenoid of the first actuator. The real-time control of the first actuator is performed by the first IC attached to the first actuator. Accordingly, the control system can control the actuator having the solenoid responsively.

In addition, preferably, the actuators include a second actuator having a motor, the controller outputs a second digital signal that identifies a target state of the second actuator to the digital signal transmission path, and a second IC attached to the second actuator among the plurality of ICs obtains the second digital signal from the digital signal transmission path, generates an electric signal that drives the motor so that the second actuator reaches a target state identified by the second digital signal, and gives the generated electric signal to the motor of the second actuator.

Accordingly, in controlling the second actuator having the motor, the controller only needs to output the second digital signal that identifies the target state of the second actuator to the digital signal transmission path. The real-time control of the second actuator is performed by the second IC attached to the second actuator. Accordingly, the control system can control the actuator having the motor responsively.

As described above, the technology disclosed herein can achieve a control system that controls the plurality of hardware units installed in the moving object using a simple structure.

An exemplary embodiment will be described in detail below with reference to the drawings.

Figure 1:
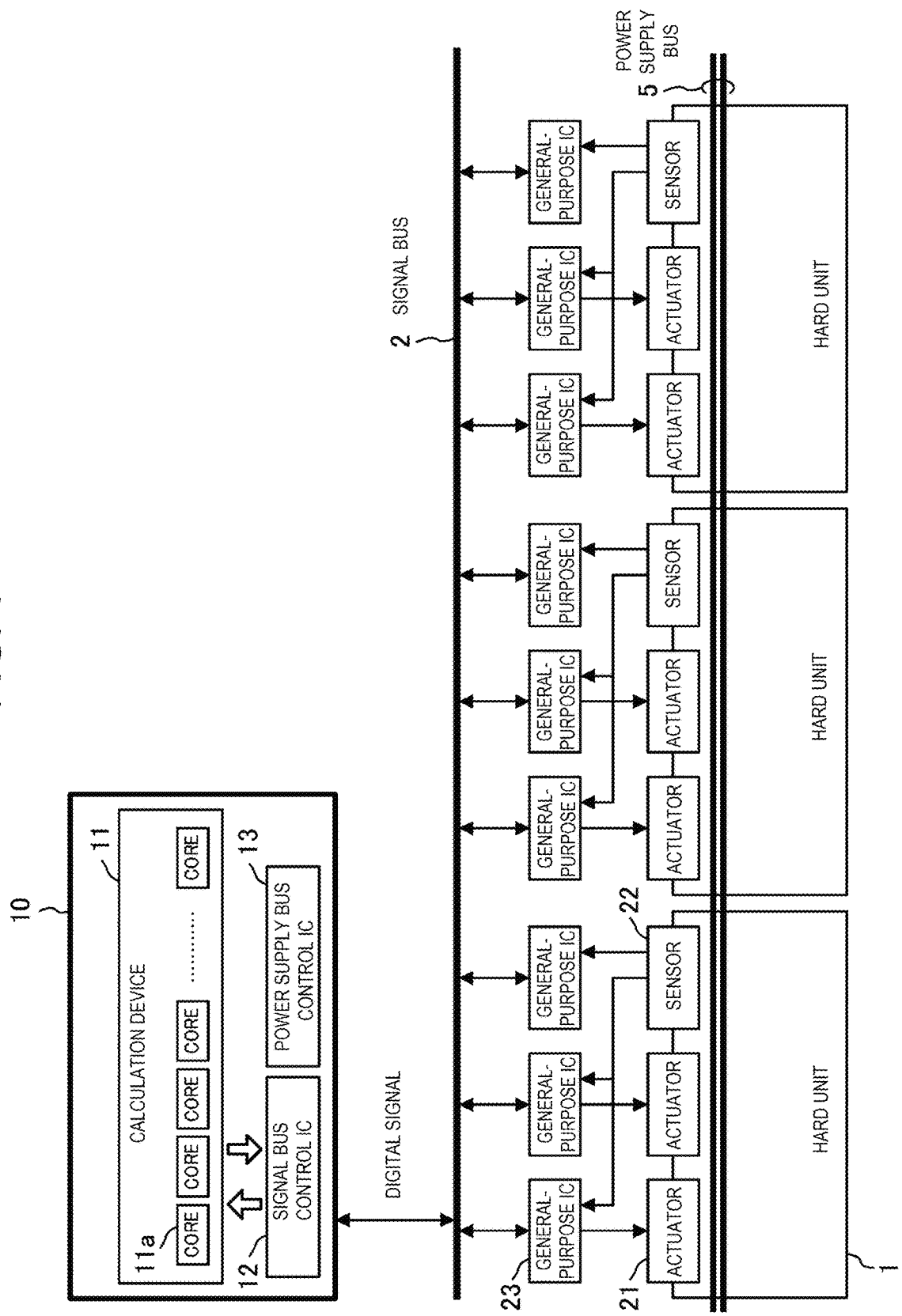
FIG. 1 illustrates a structural example of a control system for a moving object according to an embodiment.

FIG. 1 is an image diagram illustrating a structural example of a control system for a moving object according to an embodiment. The moving object has a plurality of hardware units (e.g., hardware module, circuitry module, etc.) 1 and this control system controls the individual hardware units 1. In the case of an automobile, which is an example of the moving object, the hardware units 1 are, for example, an engine, a transmission, a brake, and the like.

The control system in FIG. 1 is provided with a signal bus 2 through which digital signals are transmitted. The protocol of the signal bus 2 is, for example, CAN (controller area network), Ethernet (registered trademark), or the like. A controller 10 includes a calculation device 11 (e.g., processing circuitry) that calculates the operation of the moving object, a signal bus control IC 12 that inputs or outputs digital signals with the signal bus 2, and a power supply bus control IC 13 that controls the power supply bus 5. The calculation device 11 has, for example, a plurality of calculation cores 11a and is capable of executing ultra-high-speed calculation. Optionally, the controller 10 may include the processor 835 and other circuitry in system 800 of FIG. 18 which may be implemented as a single processor-based system, or a distributed processor based system, including remote processing, such as cloud based processing.

Each of the hardware units 1 is provided with an actuator 21 for controlling the hardware unit 1 and a sensor 22 for detecting the state of the hardware unit 1. The actuator 21 is, for example, an injector or a spark plug provided in the engine, a braking device provided in each wheel, a power steering device for assisting steering operations, a power window device provided in each door, or the like. The sensor 22 is, for example, a crank position sensor that detects the rotational position of the crankshaft, a throttle position sensor that detects the degree of opening of the throttle valve, or the like.

General-purpose ICs 23 are attached to the actuator 21 and the sensor 22. The general-purpose ICs 23 are connected to the signal bus 2. That is, in the communication path between the controller 10 and the general-purpose ICs 23, digital signals are transmitted without intervention of relay ECUs (electronic control unit).

The controller 10 causes the calculation device 11 to perform calculation/calculations that determines the operation of the moving object and generates digital signals that define the operations of the actuators 21 according to the result of the calculation. For example, the digital signals represent the physical quantity data that defines the operations of the actuators 21. Specifically, the physical quantity data is, for example, the energy representing the work performed by the actuators 21, the target temperature and target pressure of adjustment by the actuators 21, the number of revolutions of the engine, the valve opening, and the like. In addition, for example, the digital signals identify the electrical signals given to the devices of the actuators. Specifically, the electrical signals are, for example, the signal waveforms of the electrical signals, the time indicating the generation timing of the electrical signals, the frequency and voltage of the electrical signals, and the like.

The general-purpose IC 23 attached to the actuator 21 obtains the digital signal that defines the operation of the hardware unit 1 from the signal bus 2. Then, the general-purpose IC 23 generates a control signal for the actuator 21 based on the operation defined by the obtained digital signal. The general-purpose IC 23 continues to give the generated control signal to the actuator 21 until a new digital signal is obtained.

The general-purpose IC 23 attached to the sensor 22 generates the digital signal indicating the state of the hardware unit 1 based on the data signal obtained from the sensor 22 and outputs the generated digital signal to the signal bus 2. This digital signal represents, for example, the physical quantity data indicating the state of the hardware unit 1. Specifically, the physical quantity data is the temperature, the pressure, the number of revolutions, and the like.

The controller 10 obtains the digital signals representing the states of the hardware units 1 from the signal bus 2. The calculation device 11 performs calculation that determines the next operation of the moving object based on the states of the hardware units 1 represented by the obtained digital signals. Then, the controller 10 generates the digital signal that defines the operations of the actuators 21 according to the result of the calculation. The cycle in which the controller 10 generates the digital signals is much longer than the cycle in which the general-purpose ICs 23 give the control signals to the actuators 21.

Figure 2:
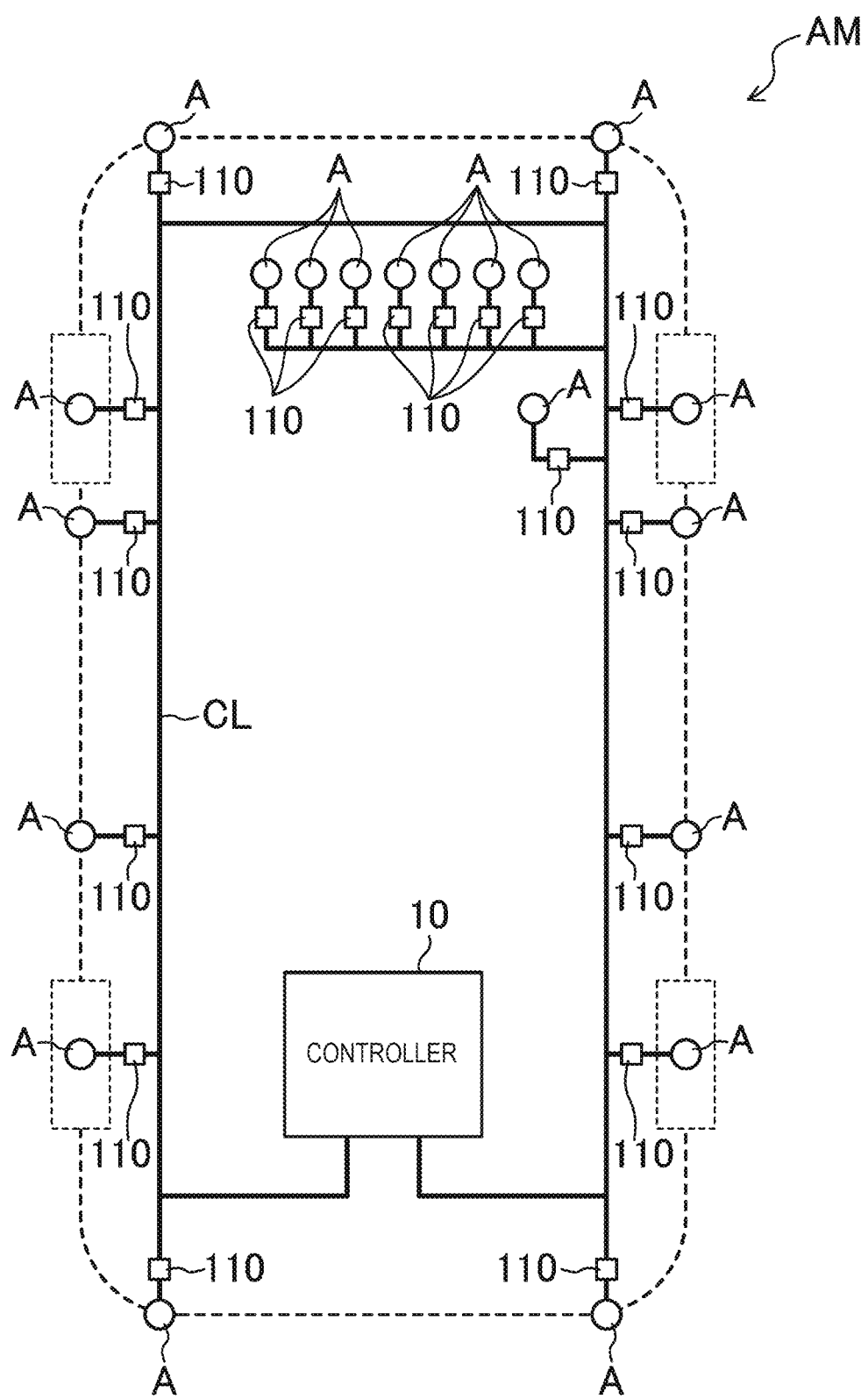
FIG. 2 illustrates a structural example when the control system according to the embodiment is applied to a vehicle.

FIG. 2 illustrates a structural example when the control system according to the embodiment is applied to a vehicle. In FIG. 2, a vehicle AM is provided with a plurality of actuators A. The actuators A are connected to ICs 110. The ICs 110 are connected to the controller 10 via a communication line CL. The communication line CL is an example of the unit for achieving the signal bus 2 in FIG. 1 and has a communication speed of, for example, 1 Gbps or more.

The vehicle AM illustrated in FIG. 2 is an automobile that enables a manual operation for a travel by the driver's operation, an assisted operation for a travel by assisting the driver's operation, and an automatic operation for a travel without the driver's intervention. This vehicle AM adopts a by-wire system that performs an electrical operation in drive control, braking control, and steering control. That is, in the vehicle AM, an operation of the accelerator pedal, an operation of the brake pedal, and an operation of the steering wheel are detected by the sensor. Then, the actuators A in charge of individual types of control are controlled via the control signals generated by the controller 10 based on the outputs of the sensors.

Although the controller 10 is disposed in the rear part of the vehicle AM in FIG. 2, the disposition of the controller 10 is not limited to this example.

Figure 7:
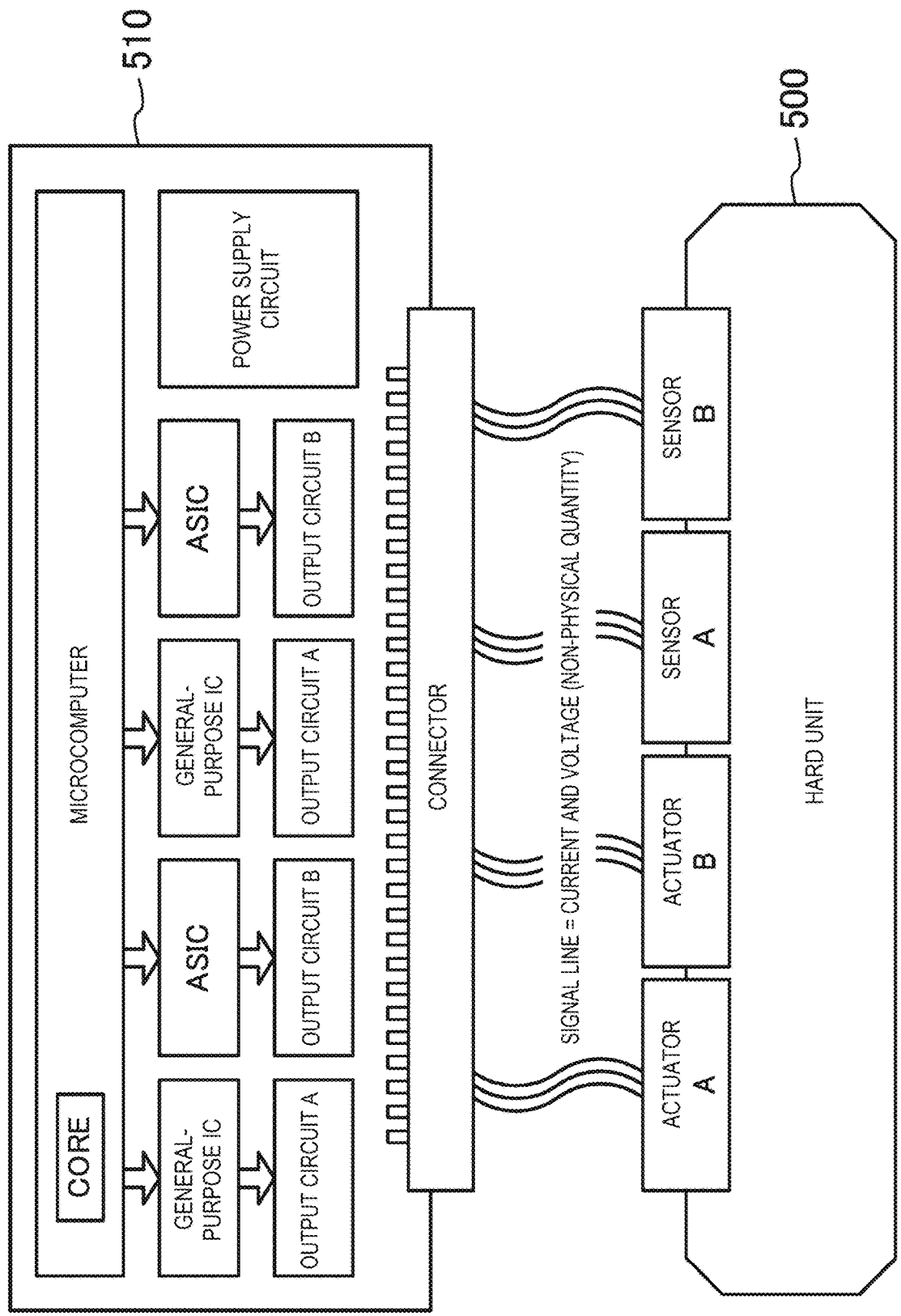
FIG. 7 is a structure image diagram illustrating the control device of a conventional hardware unit.

FIG. 7 is an image diagram illustrating the structure of a control device for a conventional hardware unit. In the structure in FIG. 7, one hardware unit 500 is provided with one ECU 510 and the actuators and the sensors of the hardware unit 500 are connected to the ECU 510 via many signal lines. When many structures as illustrated in FIG. 7 are installed in a moving object, many duplicate components are present and the system structure becomes complicated. Specifically, the ECU 510 includes many housings, electronic boards, and heat dissipation devices, the ECU 510 has many input-output circuits and power supply circuits, and many connectors and signal lines that connect the hardware unit 500 to the ECU 510 are present.

A plurality of hardware units 500 installed in the moving object may be preferably controlled by a single controller 10 to simplify the structure of the control system. This can eliminate the duplication of housings, electronic boards, heat dissipation devices, input-output circuits, power supply circuits, and the like that constitute the controller. However, even if the functions of individual ECUs are simply integrated into a single controller 10, the communication control between the controller 10 and the actuators and between the controller 10 and the sensors becomes very complicated and the amount of communication becomes enormous. In addition, for the hardware unit that needs high-speed control, such as the internal combustion engine of the vehicle, extremely fine control is preferred for the actuators. When the control signals for the actuators are sent from the controller 10 in this case, the responsiveness degrades.

Accordingly, in the present disclosure, the controller 10 performs calculation that determines the operation of the moving object and generates digital signals that define the operations of the actuators according to the result of the calculation. The digital signals represent, for example, the physical quantity data for control and have a higher degree of abstraction than the control signal actually given to the actuators. Then, the digital signals are transmitted within the moving object using the high-speed digital signal transmission path. Then, the ICs attached to the actuators obtain the digital signals generated by the controller 10 via the digital signal transmission path and generate control signals for the actuators based on the operation specified by the digital signals.

This can make the communication control between the controller 10 and the ICs attached to the actuators simple and easy and significantly reduce the amount of communication. Accordingly, the individual actuators can be controlled responsively by the single controller 10. In addition, since the digital signal transmission path does not include a relay ECU, the signals are transmitted in the communication path from the controller 10 to the actuators without relaying by the ECU. Accordingly, the cost can be reduced significantly and the power consumption can also be reduced.

In addition, the ICs attached to the actuators can be made versatile by defining standards or rules concerning the information represented by the digital signals output by the controller 10. That is, the ICs attached to the actuators only need to have the function (so-called signal translating function) of converting the operations of the actuators defined by the obtained digital signals to the control signals given to the actuators. This can reduce the cost of the ICs attached to the actuators and improve the cost performance of the control system.

A specific example of the control form of the actuators according to the embodiment will be described below.

(EXAMPLE 1) INJECTOR INJECTION CONTROL

Figure 3:
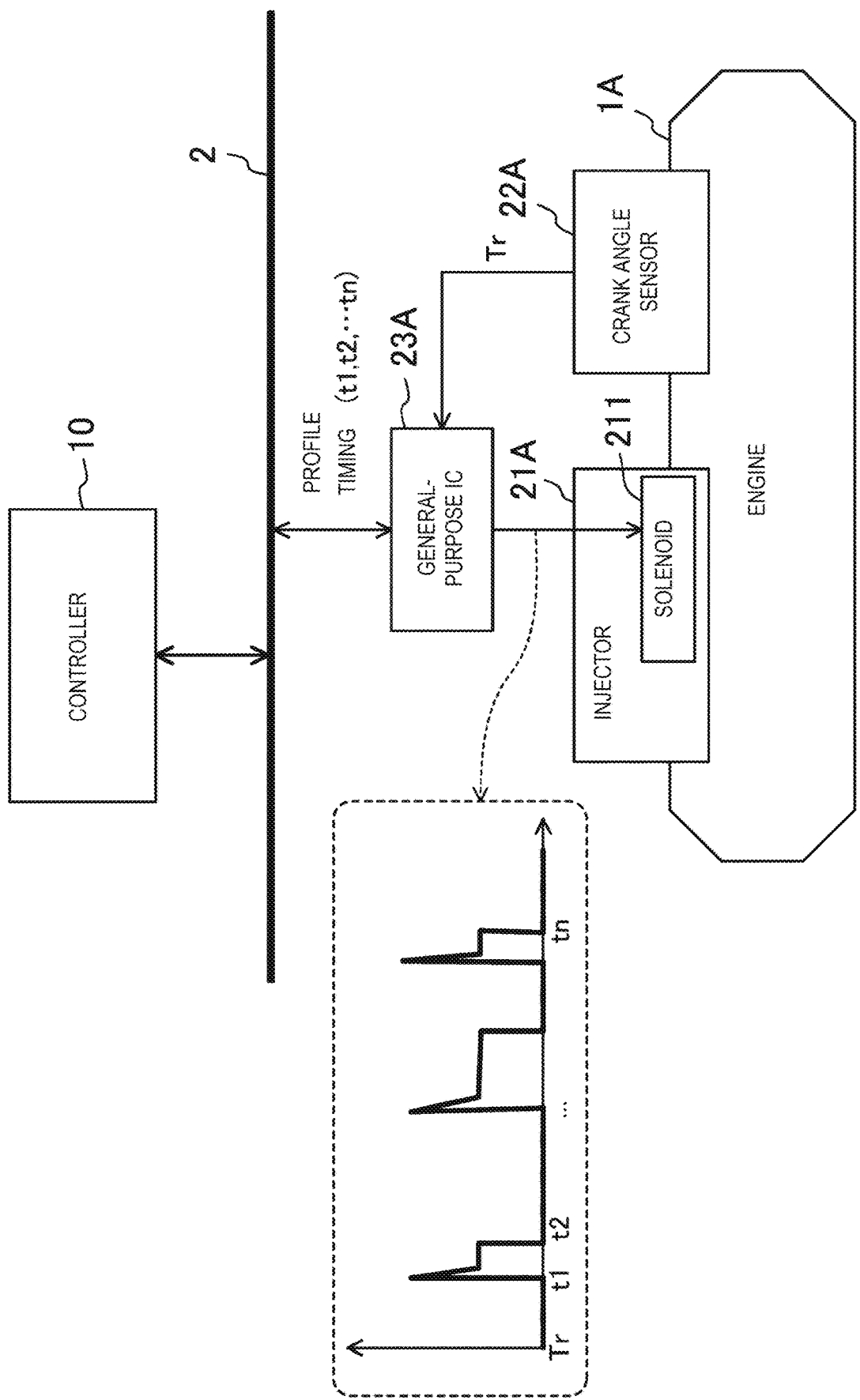
FIG. 3 illustrates an example of injector injection control.

FIG. 3 illustrates an example of injector injection control. An injector 21A is provided in the fuel device that supplies fuel to an engine 1A. The injector 21A injects, from a valve, the fuel pumped by a pump and the degree of opening or closing of the valve is controlled by a solenoid 211.

The engine combustion chamber is provided with a crank angle sensor 22A. The crank angle sensor 22A outputs a trigger signal Tr when the piston of the cylinder reaches the top dead center position.

A general-purpose IC 23A is attached to the injector 21A. The general-purpose IC 23A functions as a solenoid voltage control unit that applies a voltage to the solenoid 211 in the injector 21A. After receiving the trigger signal Tr from the crank angle sensor 22A, the general-purpose IC 23A gives the solenoid 211 a control signal with a signal waveform as illustrated in the dashed frame in FIG. 3. It should be noted here that, in the signal waveform in FIG. 3, the signal is raised with an impulse to improve the initial response of the solenoid 211 and then the state of the solenoid 211 is held at a constant voltage.

The controller 10 generates a digital signal for injector injection control. This digital signal defines the operation of the injector 21A and, in this example, identifies the signal waveform of the control signal to be given to the solenoid 211. Specifically, the digital signal for injector injection control includes profiles (target waveform) and timings t1, t2, . . . , Tn. The controller 10 outputs the generated digital signal to the signal bus 2.

The general-purpose IC 23A receives, via the signal bus 2, the digital signal for injector injection control output from the controller 10. Then, the general-purpose IC 23A generates a control signal according to the profiles and timings t1, t2, . . . , tn indicated by this digital signal and gives the generated control signal to the solenoid 211 each time the trigger signal Tr is received from the crank angle sensor 22A.

The injector injection control described above is an example of the control (referred to as the profile control in this specification) for causing the actuator to perform a desired operation by controlling the voltage or current applied to an electrical device such as a solenoid according to the instructed target waveform (profile). This example can also be used for profile control other than injector injection control.

For example, this example can also be used for ignition control of the engine. That is, in the ignition system, the general-purpose IC gives an ignition signal to the ignition coil. The controller 10 outputs a digital signal for ignition control of the engine to the signal bus 2. This digital signal includes the profile and timing that identify the ignition signal. The general-purpose IC receives the digital signal for ignition control of the engine, generates an ignition signal, and gives the generated ignition signal to the ignition coil.

(EXAMPLE 2) IDLE SPEED CONTROL

Figure 4:
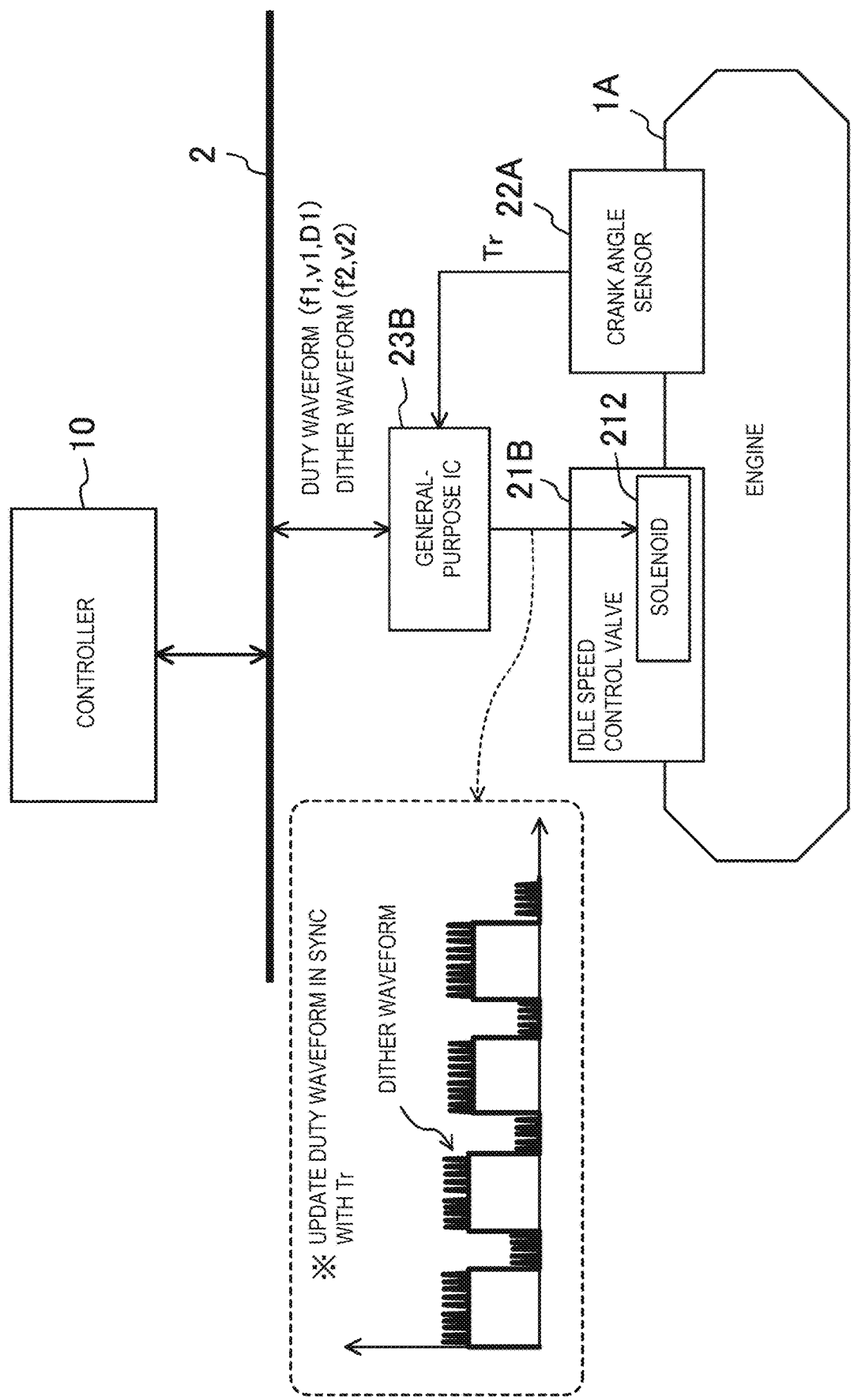
FIG. 4 illustrates an example of idle speed control.

FIG. 4 illustrates an example of idle speed control. An idle speed control valve 21B controls the number of idle revolutions by adjusting the amount of air flowing through the bypass passage of the throttle valve. The opening or closing of the idle speed control valve 21B is controlled by the solenoid 212.

The engine combustion chamber is provided with the crank angle sensor 22A. The crank angle sensor 22A outputs the trigger signal Tr when the crank angle reaches a predetermined angle. The timing at which the idle speed control system changes the flow rate of air is preferably synchronized with the crank angle. This is because the best match between air and fuel is easily optimized and a misfire and the like are unlikely to occur.

A general-purpose IC 23B is attached to the idle speed control valve 21B. The general-purpose IC 23B functions as a solenoid voltage control unit that applies a voltage to the solenoid 212 in the idle speed control valve 21B. After receiving the trigger signal Tr from the crank angle sensor 22A, the general-purpose IC 23B gives the solenoid 212 a control signal with a signal waveform as illustrated in the dashed frame in FIG. 4. The signal waveform in FIG. 4 is a duty cycle waveform (pulse signal with a fixed period) on which a dither waveform is superimposed. Dithering gives slight vibrations at a frequency higher than in the control signal to improve the responsiveness of the solenoid 212.

The controller 10 generates a digital signal for idle speed control. This digital signal defines the operation of the idle speed control valve 21B and, in this example, identifies the signal waveform of the control signal given to the solenoid 212. Specifically, the digital signal for idle speed control represents a reference frequency f1, a reference voltage v1, and a duty ratio D1 that indicates a duty cycle waveform, and a frequency f2 and a voltage v2 that indicate a dither waveform. The controller 10 outputs the generated digital signal to the signal bus 2.

The general-purpose IC 23B receives the digital signal for idle speed control via the signal bus 2. Then, the general-purpose IC 23B generates a control signal according to the reference frequency f1, the reference voltage v1, and the duty ratio D1 of the duty waveform, and the frequency f2 and the voltage v2 of the dither waveform indicated by this digital signal, and gives the generated control signal to the solenoid 212. The general-purpose IC 23B updates the duty cycle waveform of the control signal according to the digital signal for idle speed control each time the general-purpose IC 23B receives the trigger signal Tr from the crank angle sensor 22A.

The idle speed control described above is an example of the control (referred to as the duty cycle control in this specification) that causes the actuator to perform a desired operation by controlling the voltage or the current applied to an electrical device such as a solenoid according to the instructed duty cycle waveform. This duty cycle control can also be used for control other than idle speed control. For example, the duty cycle control can be used for valve control by the air pressure or the hydraulic pressure.

(EXAMPLE 3) THROTTLE CONTROL

Figure 5:
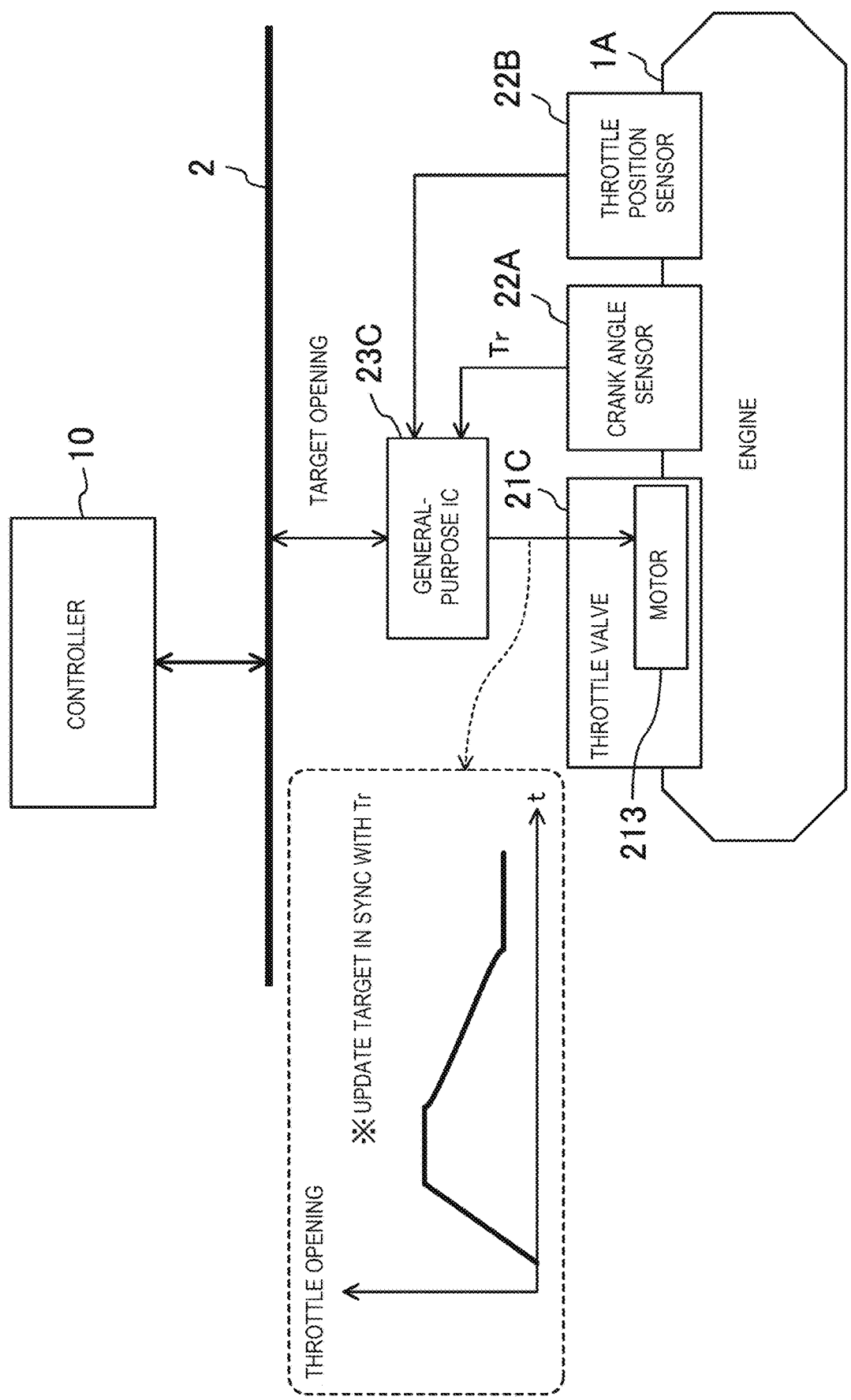
FIG. 5 illustrates an example of throttle control.

FIG. 5 illustrates an example of throttle control. The throttle system is a mechanism that adjusts the amount of intake air supplied to the engine 1A. In the throttle valve 21C, the throttle valve opening is adjusted by a motor 213.

The engine combustion chamber is provided with the crank angle sensor 22A. The crank angle sensor 22A outputs the trigger signal Tr when the crank angle reaches a predetermined angle. The throttle valve 213 is provided with a throttle position sensor 22B that detects the current position of the throttle.

A general-purpose IC 23C is attached to the throttle valve 21C. The general-purpose IC 23C functions as a control unit that drives the motor 213 in the throttle valve 21C and controls the motor position. The general-purpose IC 23C drives the motor 213 of the throttle valve 21C according to the instructed target opening.

The controller 10 generates a digital signal for throttle control. This digital signal defines the operation of the throttle valve 21C and indicates the target opening of the throttle valve 21C. The controller 10 outputs the generated digital signals to the signal bus 2.

The general-purpose IC 23C receives the digital signal for throttle control via the signal bus 2. Then, the general-purpose IC 23C drives the motor 213 with reference to the signal transmitted from the throttle position sensor 22B so that the opening of the throttle valve 21C becomes the target opening indicated by this digital signal. When receiving the trigger signal Tr from the crank angle sensor 22A, the general-purpose IC 23C updates the target opening of the throttle bar 21C by receiving a new digital signal.

The throttle control described above is an example of the motor position control that causes the actuator to perform a desired operation by controlling the drive signal given to the motor according to the instructed position target. This motor position control can also be used for control other than throttle control.

(EXAMPLE 4) POWER WINDOW CONTROL

Figure 6:
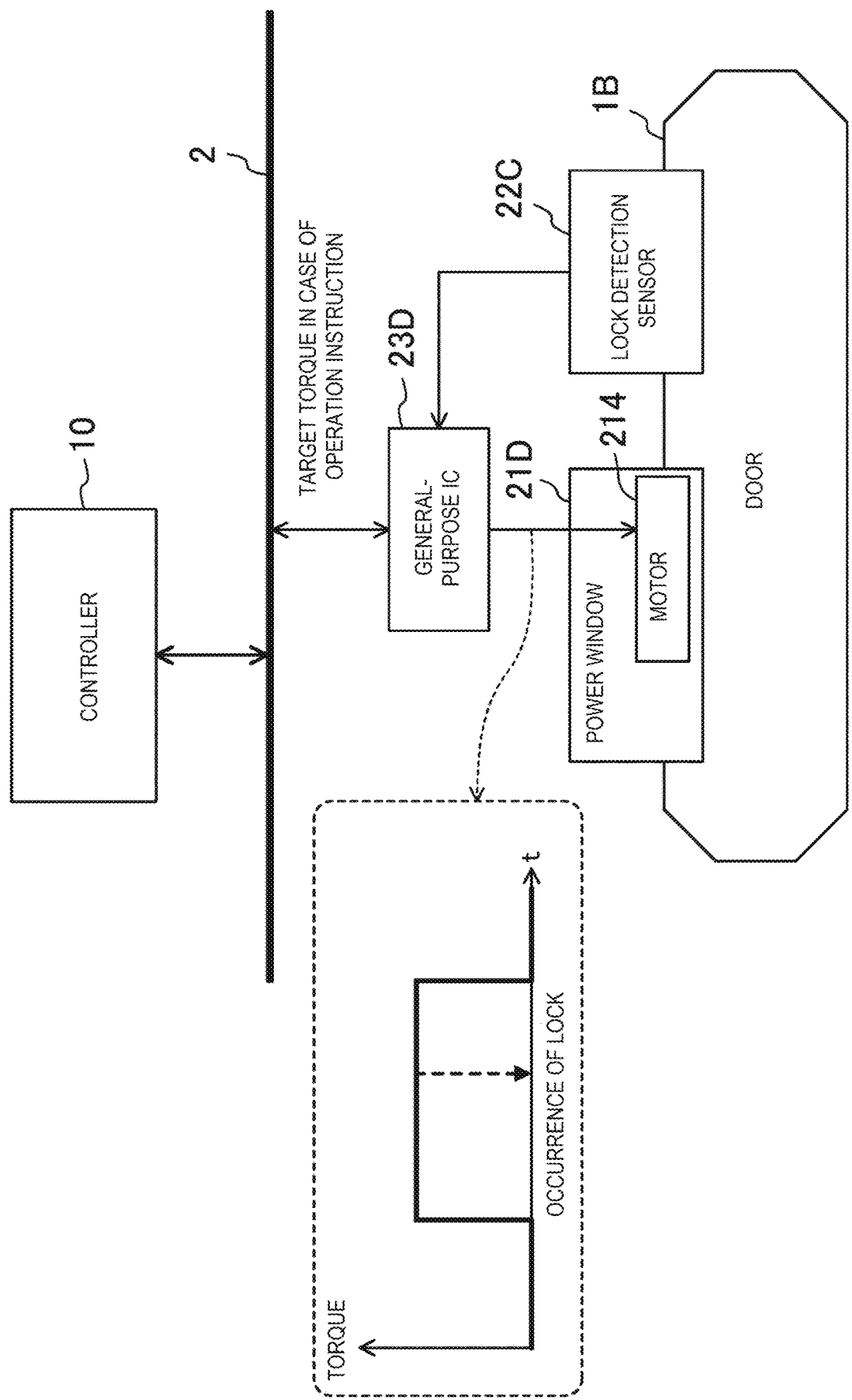
FIG. 6 illustrates an example of power window control.

FIG. 6 illustrates an example of power window control. A power window 21D provided in a door 1B performs an open-close operation of the window via a motor 214.

The power window 21D is provided with a lock detection sensor 22C. The lock detection sensor 22C receives the feedback of an energy change from the motor 214, detects that a hand or the like has been caught in the power window 21D based on the feedback, and outputs a motor lock signal during detection.

A general-purpose IC 23D is attached to the power window 21D. When instructed to operate the power window 21D, the general-purpose IC 23D drives the motor 214 of the power window 21D according to the instructed target torque. When receiving the motor lock signal while the power window 21D operates, the general-purpose IC 23D reduces the torque of the motor 214 regardless of the instructed target torque.

The controller 10 generates a digital signal for power window control. This digital signal defines the operation of the power window 21D and indicates a window open-close operation instruction and the target torque while the power window operates. The controller 10 outputs the generated digital signal to the signal bus 2.

The general-purpose IC 23D receives the digital signal for power window control via the signal bus 2. Then, when an open-close operation instruction is present, the general-purpose IC 23D drives the motor 214 of the power window 21D according to the instructed target torque. However, when receiving the motor lock signal from the lock detection sensor 22C while driving the motor 214, the general-purpose IC 23D reduces the torque of the motor 214.

The power window control described above is an example of the motor torque control that causes the actuator to perform a desired operation by controlling the drive signal given to the motor according to the instructed torque target. This motor torque control can also be used not only for power window control but also for the control of, for example, a power seat belt.

OTHER EXAMPLES

In addition to the examples described above, for example, fan control, heater control, supercharger control, and the like can also be achieved similarly. For example, in supercharger control, the controller 10 only needs to output digital signals indicating the turn-on or -off of a supercharger and the opening of an air bypass valve when the supercharger turns on.

As described above, according to the embodiment, the plurality of hardware units 1 installed in the moving object is controlled by the single controller 10. Then, the controller 10 only needs to output the digital signals that define the operations of the actuators 21 to the signal bus 2 to control the plurality of hardware units 1 and the real-time control of the actuators 21 is performed by the ICs 23 attached to the actuators 21. Therefore, according to this control system, the actuators 21 can be controlled responsively by the single controller 10. In addition, since the signal bus 2 does not include a relay ECU, signals are transmitted through the communication path from the controller 10 to the actuators 23 without relaying by the ECU. Accordingly, the cost can be reduced significantly and the power consumption can also be reduced.

In the present disclosure, the digital signal transmission path may be other than the signal bus 2 or the communication line CL and may be achieved by, for example, an optical fiber cable, wireless communication, or the like.

The following description relates to a computer environment in which embodiments of the present disclosure may be implemented. This environment may include an embedded computer environment, local multi-processor embodiment, remote (e.g., cloud-based) environment, or a mixture of all the environments.

Figure 8:
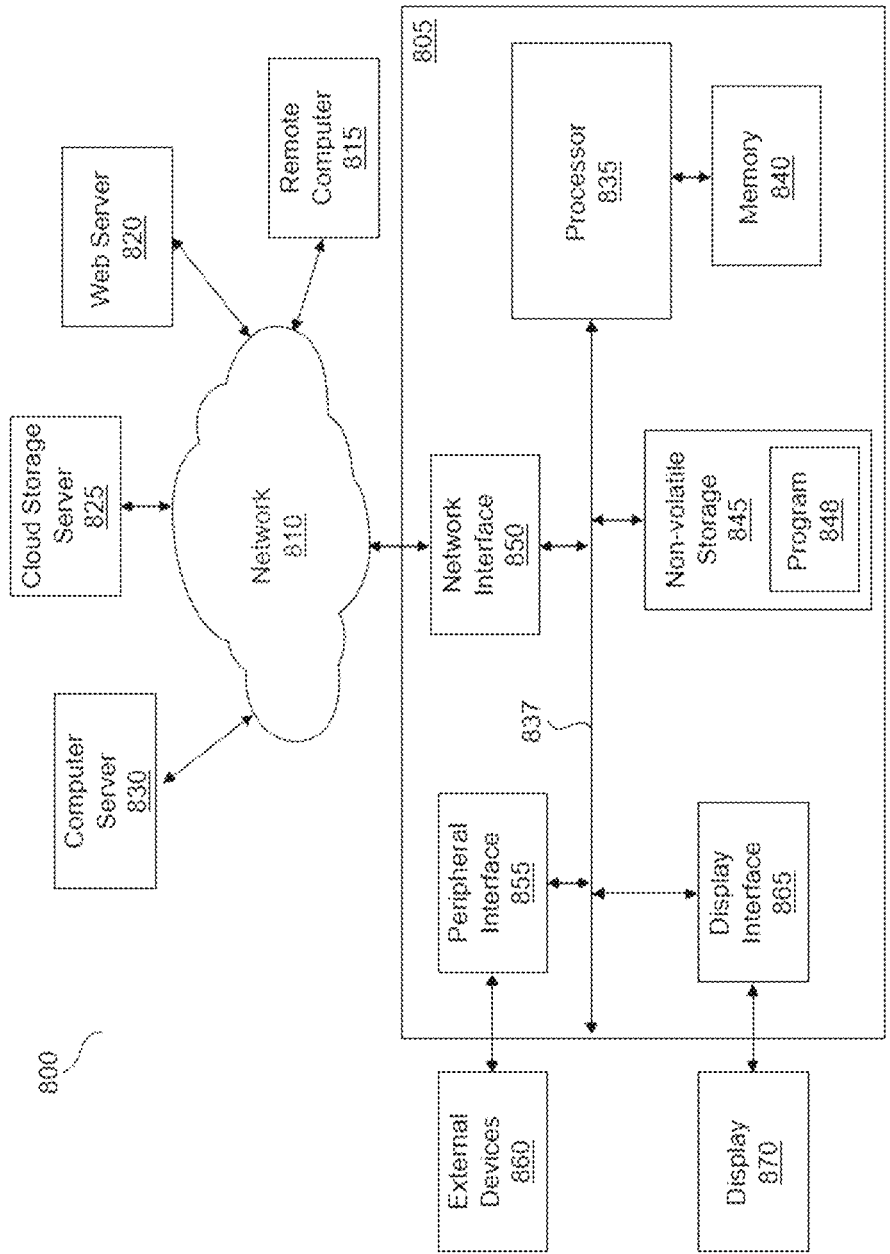
FIG. 8 is a block diagram of computer-based circuitry that may be used to implement control features of the present disclosure.

FIG. 8 illustrates a block diagram of a computer that may implement the various embodiments described herein. The present disclosure may be embodied as a system, a method, and/or a computer program product. The computer program product may include a computer readable storage medium on which computer readable program instructions are recorded that may cause one or more processors to carry out aspects of the embodiment.

The non-transitory computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. The computer readable program instructions may execute entirely on a user's personal computer, notebook computer, tablet, or smartphone, entirely on a remote computer or compute server, or any combination of these computing devices. The remote computer or compute server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

FIG. 8 is a functional block diagram illustrating a networked system 800 of one or more networked computers and servers. In an embodiment, the hardware and software environment illustrated in FIG. 8 may provide an exemplary platform for implementation of the software and/or methods according to the present disclosure. Referring to FIG. 8, a networked system 800 may include, but is not limited to, computer 805, network 810, remote computer 815, web server 820, cloud storage server 825 and compute server 830. In some embodiments, multiple instances of one or more of the functional blocks illustrated in FIG. 8 may be employed. Additional detail of computer 805 is shown in FIG. 8. The functional blocks illustrated within computer 805 are provided only to establish exemplary functionality and are not intended to be exhaustive. And while details are not provided for remote computer 815, web server 820, cloud storage server 825 and compute server 830, these other computers and devices may include similar functionality to that shown for computer 805.

Computer 805 may be a personal computer (PC), a desktop computer, laptop computer, tablet computer, netbook computer, a personal digital assistant (PDA), a smart phone, or any other programmable electronic device capable of communicating with other devices on network 810.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC). Processor 835 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 837 may be a proprietary or industry standard high-speed parallel or serial peripheral interconnect bus, such as ISA, PCI, PCI Express (PCI-e), AGP, and the like.

Memory 840 and non-volatile storage 845 may be computer-readable storage media. Memory 840 may include any suitable volatile storage devices such as Dynamic Random Access Memory (DRAM) and Static Random Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine readable instructions and/or data that is stored in non-volatile storage 845 and is used to create, manage and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include devices such as a keyboard, a mouse, a keypad, a touch screen, and/or other suitable input devices. External devices 860 may also include portable computer-readable storage media such as, for example, thumb drives, portable optical or magnetic disks, and memory cards. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

Display interface 865 may connect computer 805 to display 870. Display 870 may be used, in some embodiments, to present a command line or graphical user interface to a user of computer 805. Display interface 865 may connect to display 870 using one or more proprietary or industry standard connections, such as VGA, DVI, DisplayPort and HDMI.

As described above, network interface 850, provides for communications with other computing and storage systems or devices external to computer 805. Software programs and data discussed herein may be downloaded from, for example, remote computer 815, web server 820, cloud storage server 825 and compute server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and compute server 830.

The moving object according to the present disclosure is not limited to a vehicle and the control system according to the present disclosure is applicable to, for example, a ship, an airplane, a robot, or the like.

The embodiment described above is only an example and the scope of the present disclosure should not be understood in a limited manner. The scope of the present disclosure is defined by the claims and all modifications and changes belonging to the equivalent scope of the claims fall within the scope of the present disclosure.

INDUSTRIAL APPLICABILITY

The technology disclosed herein is useful in achieving a control system that controls a plurality of hard units installed in a moving object using a simple structure.

DESCRIPTION OF REFERENCE SIGNS AND NUMERALS

1: hardware unit
2: signal bus (digital signal transmission path)
10: controller
11: calculation device
12: signal bus control IC
21: actuator
23, 23A, 23B, 23C, 23D: IC
110: IC
211, 212: solenoid
213, 214: motor
A: actuator
CL: communication line

What is claimed is:

1. A control system that controls a plurality of hardware units of a vehicle having an engine, a transmission, and a brake, the control system comprising:
a single signal bus that transmits digital signals without including a relay electronic control unit (ECU) in the single signal bus;
a controller that includes at least a calculator to calculate an operation of the vehicle and a signal bus control integrated circuit (IC) for inputting and outputting the digital signals to and from the single signal bus; and
a plurality of ICs, that are attached to actuators, configured to control the hardware units and connected to the single signal bus, wherein an IC is provided for each of the actuators,
wherein the controller is configured to cause the calculator to perform calculation that determines an operation of the vehicle, generate a digital signal that defines an operation of the actuators according to a result of the calculation, and cause the signal bus control IC to output the generated digital signal to the single signal bus, and
the plurality of ICs obtain the digital signal that defines the operation of the actuators from the single signal bus and generate a control signal for the actuators based on the operation defined by the obtained digital signal,
wherein each of the ICs has only a function of converting the actuator motion specified by the digital signal into a control signal to be given to the actuator.

2. The control system according to claim 1, wherein the actuators include a first actuator having a solenoid.

3. The control system according to claim 2, wherein the controller is configured to output, to the single signal bus, a first digital signal that identifies an electrical signal given to the solenoid of the first actuator.

4. The control system according to claim 3, further comprising:
a first IC among the plurality of ICs, attached to the first actuator, is configured to obtain the first digital signal from the single signal bus, generate the electrical signal identified by the first digital signal, and provide the generated electrical signal to the solenoid of the first actuator.

5. The control system according to claim 1, wherein the actuators include a second actuator having a motor.

6. The control system according to claim 5, wherein the controller is configured to output a second digital signal that identifies a target state of the second actuator to the single signal bus.

7. The control system according to claim 6, further comprising:
a second IC among the plurality of ICs, attached to the second actuator, is configured to obtain the second digital signal from the single signal bus, generate an electrical signal that drives the motor so that the second actuator reaches a target state identified by the second digital signal, and provide the generated electrical signal to the motor of the second actuator.

8. A vehicle comprising:
a control system that controls a plurality of hardware units installed in the vehicle, the control system including:
a single signal bus that transmits digital signals without including a relay electronic control unit (ECU) in the single signal bus;
a controller that includes at least a calculator to calculate an operation of the vehicle and a signal bus control integrated circuit (IC) for inputting and outputting the digital signals to and from the single signal bus; and
a plurality of ICs, that are attached to actuators, configured to control the hardware units and connected to the single signal bus, wherein an IC is provided for each of the actuators,
wherein the controller is configured to cause the calculator to perform calculation that determines an operation of the vehicle, generate a digital signal that defines an operation of the actuators according to a result of the calculation, and cause the signal bus control IC to output the generated digital signal to the single signal bus, and the plurality of ICs obtain the digital signal that defines the operation of the actuators from the single signal bus and generate a control signal for the actuators based on the operation defined by the obtained digital signal, wherein each of the ICs has only a function of converting the actuator motion specified by the digital signal into a control signal to be given to the actuator.

9. The vehicle according to claim 8,
wherein the actuators include a first actuator having a solenoid.

10. The vehicle according to claim 9, wherein
the controller is configured to output, to the single signal bus, a first digital signal that identifies an electrical signal given to the solenoid of the first actuator.

11. The vehicle according to claim 10, further comprising:
a first IC among the plurality of ICs, attached to the first actuator, is configured to obtain the first digital signal from the single signal bus, generate the electrical signal identified by the first digital signal, and provide the generated electrical signal to the solenoid of the first actuator.

12. The vehicle according to claim 8,
wherein the actuators include a second actuator having a motor.

13. The vehicle according to claim 12, wherein
the controller is configured to output a second digital signal that identifies a target state of the second actuator to the single signal bus.

14. The vehicle according to claim 13, further comprising:
a second IC among the plurality of ICs, attached to the second actuator, is configured to obtain the second digital signal from the single signal bus, generate an electrical signal that drives the motor so that the second actuator reaches a target state identified by the second digital signal, and provide the generated electrical signal to the motor of the second actuator.

15. A control system that controls a plurality of hardware units of a vehicle having an engine, a transmission, and a brake, the control system comprising:
a single signal bus that transmits digital signals without including a relay electronic control unit (ECU) in the single signal bus;
means for controlling that includes at least a means for calculating an operation of the vehicle and a signal bus control integrated circuit (IC) for inputting and outputting the digital signals to and from the single signal bus; and a plurality of ICs, that are attached to means for actuating, configured to control the hardware units and connected to the single signal bus, wherein an IC is provided for each of the actuators, wherein the means for controlling is configured to cause the means for calculating to perform calculation that determines an operation of the vehicle, generate a digital signal that defines an operation of the means for actuating according to a result of the calculation, and cause the signal bus control IC to output the generated digital signal to the single signal bus, and the plurality of ICs obtain the digital signal that defines the operation of the means for actuating from the single signal bus and generate a control signal for the means for actuating based on the operation defined by the obtained digital signal, wherein each of the ICs has only a function of converting the actuator motion specified by the digital signal into a control signal to be given to the actuator.

16. The control system according to claim 15,
wherein the means for actuating include a first means for actuating having a solenoid.

17. The control system according to claim 16, wherein
the means for controlling is configured to output, to the single signal bus, a first digital signal that identifies an electrical signal given to the solenoid of the first means for actuating.

18. The control system according to claim 17, further comprising:
a first IC among the plurality of ICs, attached to the first means for actuating, is configured to obtain the first digital signal from the single signal bus, generate the electrical signal identified by the first digital signal, and provide the generated electrical signal to the solenoid of the first means for actuating.

19. The control system according to claim 15,
wherein the means for actuating include a second means for actuating having a motor.

20. The control system according to claim 15, wherein
the means for controlling is configured to output a second digital signal that identifies a target state of the second means for actuating to the single signal bus, and
a second IC among the plurality of ICs, attached to the second means for actuating, is configured to obtain the second digital signal from the single signal bus, generate an electrical signal that drives the motor so that the second means for actuating reaches a target state identified by the second digital signal, and provide the generated electrical signal to the motor of the second means for actuating.

* * * * *